mso10395410B2

United States Patent
Dorie

(10) Patent No.: US 10,395,410 B2
(45) Date of Patent: Aug. 27, 2019

(54) SYSTEM AND METHOD FOR REAL-TIME POSE-BASED DEFORMATION OF CHARACTER MODELS

(71) Applicant: TAKE TWO INTERACTIVE SOFTWARE, INC., New York, NY (US)

(72) Inventor: Jason Dorie, Petaluma, CA (US)

(73) Assignee: TAKE-TWO INTERACTIVE SOFTWARE, INC., New York, NY (US)

( * ) Notice: Subject to any disclaimer, the term of this patent is extended or adjusted under 35 U.S.C. 154(b) by 0 days.

(21) Appl. No.: 14/605,211

(22) Filed: Jan. 26, 2015

(65) Prior Publication Data

US 2015/0138209 A1 May 21, 2015

Related U.S. Application Data

(63) Continuation of application No. 11/944,602, filed on Nov. 23, 2007, now Pat. No. 8,941,664.

(60) Provisional application No. 60/867,038, filed on Nov. 22, 2006.

(51) Int. Cl.
*G06T 13/40* (2011.01)

(52) U.S. Cl.
CPC .................................. *G06T 13/40* (2013.01)

(58) Field of Classification Search
None
See application file for complete search history.

(56) References Cited

U.S. PATENT DOCUMENTS

| 6,522,331 | B1 * | 2/2003 | Danks | G06T 13/40 |
|---|---|---|---|---|
| | | | | 345/473 |
| 7,782,324 | B2 | 8/2010 | Goldfarb | |
| 2004/0012594 | A1 | 1/2004 | Gauthier et al. | |
| 2005/0219250 | A1 | 10/2005 | Sepulveda | |
| 2005/0225552 | A1 | 10/2005 | Anand | |
| 2005/0243092 | A1 | 11/2005 | Haratsch | |
| 2006/0090063 | A1 * | 4/2006 | Theis | G06F 8/4451 |
| | | | | 712/239 |
| 2006/0274070 | A1 * | 12/2006 | Herman | A63F 13/10 |
| | | | | 345/474 |

* cited by examiner

*Primary Examiner* — Said Broome
(74) *Attorney, Agent, or Firm* — Orrick, Herrington & Sutcliffe LLP

(57) ABSTRACT

Systems and methods for animating a character model by deforming the character model based on poses. Embodiments may contain a modeling component in which a user may create a character model that contains a rig representing animation controls applied to the model, and geometric/graphic parameters for graphically rendering the model. The user also may create directed graphs that contain nodes representing operations that act on the character model and directional connections representing data flow between nodes. The embodiments may contain a compiling component that convert a directed graph into a sequence of instructions that perform the operations denoted at the nodes. The embodiments provide tools and methods to reduce redundancies in the sequence of instructions producing an optimized version of instruction sequence. The resulting instructions are then convertible into machine code for running on a video game device or loaded into a plug-in of a graphic rendering engine.

10 Claims, 6 Drawing Sheets

SYSTEM AND METHOD FOR REAL-TIME POSE-BASED DEFORMATION OF CHARACTER MODELS

CROSS-REFERENCE TO RELATED APPLICATION(S)

This application claims priority to U.S. Provisional Application No. 60/867,038, filed Nov. 22, 2006, which is incorporated herein by reference in its entirety.

FIELD OF THE INVENTION

The present invention relates generally to procedural deformation of character models in three-dimensional computer graphics and, more specifically, to systems and methods that facilitate real-time pose-based deformation of character models.

BACKGROUND INFORMATION

Procedural deformation adds realism to the animation of character models by using measurable properties of the current character pose to produce additional deformation. The pose of a character may be generated on a skeleton model that contains joints and links connecting joints in a process called primary animation. An animator using an animation software package such as, for example, Autodesk® Maya®, may create a rig(s) that controls the motion of joints in the skeleton model. By changing values of the rig(s), the animator may specify positions of the joints in the skeleton model in a coordinate system, for example, a three-dimensional space, at a series of time instances to produce the primary animation. A customized secondary animation for the deformation of parts that surround joints, for example, muscles or skins of a character, may be derived from the primary animation of joints. Presently, software developers work with animators to create custom applications for each secondary animation effect. Such custom applications may include, for example, bending the elbow of a character model arm causes the bicep of the same arm to flex. In such a modeling, bending the elbow further causes a crease to form on the skin between the upper arm and the forearm. FIG. 1 shows, via a graph of operations, how certain events, for example, a crease forming on the skin, may occur depending entirely upon one or more conditions, i.e., the further bending of the elbow.

The resulting deformation of a character model may be caused by many events expressed in the form of conditions. This approach is available in character model rigging. Modeling software packages need to represent these operations in a dynamic and editable way, but unfortunately, doing so tends to decrease the operational speed. A low display refresh rate of, for example, as low as 4 frames per second, may be acceptable for the use of a software package in modeling or rendering. However, a video game generally may require a rate of, for example, 60 frames per second with many characters processed at the same time. The current approach for deforming character model based on poses does not achieve a high display rate for video games. Accordingly, it is desirable to provide systems and methods for real-time pose-based character model deformation.

SUMMARY OF INVENTION

An example embodiment of the present invention provides a system and a method for providing real-time posed-based deformation of character models to accomplish improved animation, e.g., realistic animation. An embodiment of the present invention may include providing a character model and a directed graph created using a modeling package, for example, the Autodesk® Maya® package. The character model may be created using the same modeling package or extracted from a database storage. An example character model may include a set of connected vertices and polygons representing the shape of the model, and a set of parameters associated with each polygon to characterize properties for graphic rendering. The graphic rendering properties may include a set of surface properties and image maps which represent the surface shading and color of the model. The character model also may include controls for animating the model. In an embodiment of the present invention, the controls may include a skeletal model, containing joints and links connecting joints, associated with animation rigs that control the motion of joints. The animation of the skeletal model through rigs may secondarily cause deformation of the character model based on specified relationships between the rigs and the model. The directed graph may contain nodes representing operations that act on the character model and connections each of which represents data flow from a source end to a destination end. The operations denoted on a node may be constrained by other nodes through connections to the node. Operations denoted on a node may include arithmetic or specifically designed operations on data flown in from connections. The output value of a node thus may be constrained by other nodes that provide connections of data flow to the node.

In an example embodiment of the present invention, nodes may include plugs associated with node properties. The plugs may be classified into output, input or attribute plugs among which the output plugs may contain the result of operations carried out on the node, the input plugs may contain data required for carrying out the operations on the node, and the attribute plugs may contain data applied to the node, but not required for its result. Data may flow from sources which may be any type of plugs or nodes to destinations which may be input plugs, attribute plugs or nodes. The sources and destinations may be connected to a single or a plurality of plugs or nodes.

An example embodiment of the present invention provides a system component and a method to provide the directed graph to a dependency solver in which the order of operations in the directed graph may be resolved. Since data in a directed graph flows directionally in a connection from a source end to a destination end, the dependency of nodes, i.e., the order of operations, may be resolved recursively. In an embodiment of the present invention, the directed graph contains at least one node that does not depend on any other nodes, namely a zero-dependency node. The dependency solver may proceed from the zero-dependency node to determine dependencies of other nodes resulting in a list of nodes according to the order of operations.

An example embodiment of the present invention provides a system and a method to compile the list of operations into machine instructions. The compiler may visit each node in the list of ordered operations, and, for each node, generate a list of instructions that perform the operation denoted by the node. The embodiment may perform some forms of instruction optimization, for example, reusing values that have already been computed. The resulting sequence of instructions may include generic matrix, vector, scalar operations, or specially designed instructions to handle complex operations with minimal overhead to the instructions.

An example embodiment of the present invention provides a system and a method to generate an optimized version of the sequence of instructions produced from the graph node compiler. The optimization may reduce redundancies in the sequence of instruction using a set of optimization functions including, for example, register move, dead code removal, identity operations, constant folding, duplicate results and peephole optimizations. In an embodiment of the present invention, the optimization may be carried out in two phases in which the phase 1 iteratively performs register move optimization, peephole optimization and/or dead code removal until there is no more modification to the instruction code, and then the phase 2 iteratively performs another peephole optimization and another register move optimization until there is no further modification to the instruction code. A global iterative optimization of phase 1 and 2 may follow until there is no further modification in phase 1 and 2 optimization. The optimization of instructions may then proceed to delete unused registers and end the process. The resulting optimized sequence of instructions may contain less redundancy in computation and storage than the original sequence of instructions.

An example embodiment of the present invention provides a system and a method to generate machine executable codes for the sequence of instructions. The code generator may produce a register allocation table, external variable bindings, and any information that may be needed to execute the code in a virtual machine including hardware virtual machines, for example, video game device or computers, or a software virtual machine embedded in the operating system of a device including video game devices or computers. An example embodiment of the present invention provides a system and a method to optionally convert the optimized sequence of instructions into a programming language code, for example, C++ code, which may be further compiled using a programming language compiler, for example, a C++ compiler, for later speedy execution.

An example embodiment of the present invention provides a system and a method to interpret the generated code for the virtual machine and perform the operations described therein to the character model. The embodiment further loads the final compiled operations in the form of a token stream and the character model containing displaying parameters for a display rendering device. In an embodiment of the present invention, the display rendering device is the Autodesk® Maya® modeling package which includes a plug-in function that may be used to load the generated token streams and the character model for graphical rendering. In an embodiment of the present invention, the display rendering device is a video game device which is capable of animating the character model based on the token stream in real-time. The video game device may contain input modalities, for example, a computer keyboard, a computer mouse, a pointing device, a joystick, a wired or wireless handheld controller, or any sensor that is capable of converting physiological signals into animation parameters, which may be associated with rigs that control the deformation or animation of the character model.

For clarification purposes, in some descriptions herein, the term rig will be used to refer to the character skeleton combined with an arrangement of nodes which performs what is commonly termed the secondary animation operations.

DETAILED DESCRIPTION OF THE EXAMPLE EMBODIMENTS

Figure 1:
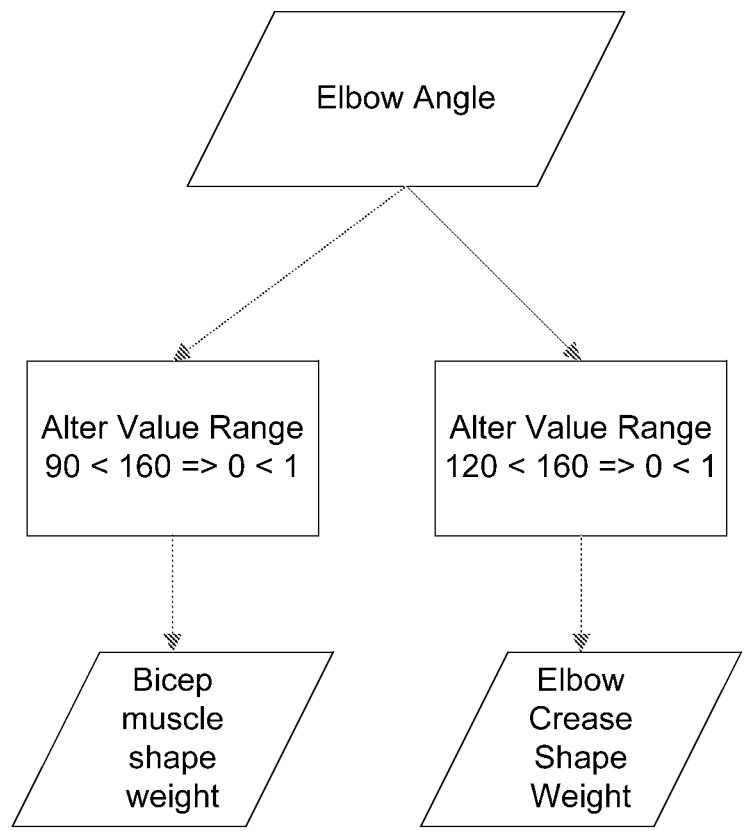
FIG. 1 shows a block diagram illustrating an example of a procedure to deform a character model.
Figure 2:
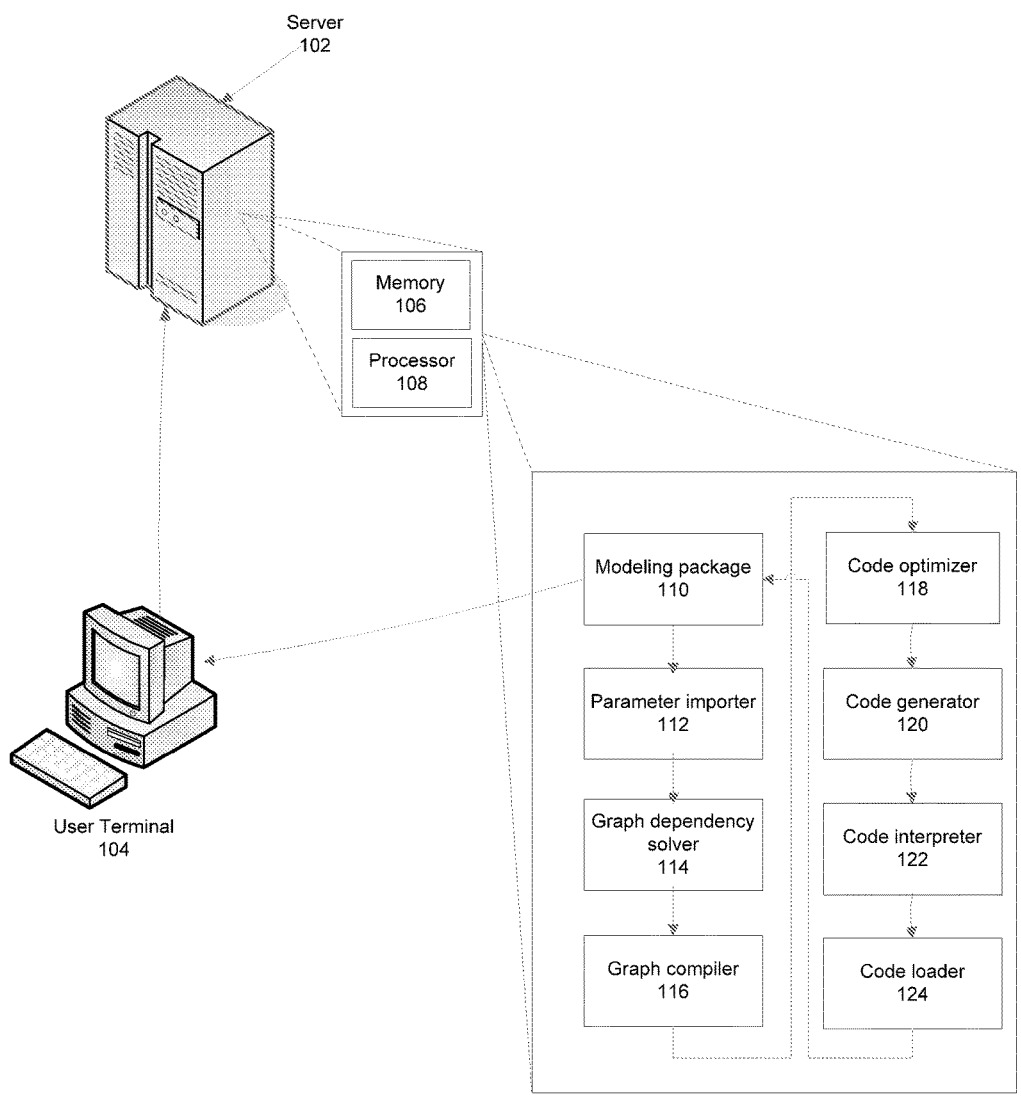
FIG. 2 shows a block diagram illustrating components of an example embodiment of the present invention.

FIG. 2 shows a system according to an example embodiment of the present invention.

The system may include a server 102 and a user terminal 104. The server may further include a memory 106 and a processor 108. In an embodiment, the processor 106 executes application instructions stored in the memory 108. The execution of the application instruction may include inputting data from the user terminal 104, processing of data stored in the memory 108, and transmitting results in the form of animations to the user terminal 104.

A user of the system may use the terminal 104 to send animation instructions to the server 102 and further to the memory 106 and processor 108 thereof. The animation instructions may instruct the server to start a character modeling package, for example, the Autodesk® Maya® and/or any other 3-dimensional graphic modeling package. The user terminal also may include input devices through which the user may enter animation parameters to character models. Examples of animation parameters include character rigs which may be adapted to control a skeleton model based on which the character may be animated from the poses of the skeletal joints. The types of input devices may include a computer keyboard, a computer mouse, a pointing device, a joystick, a wired or wireless handheld controller, or any sensor that is capable of converting physiological signals into animation parameters. The user may use input devices to build character models, construct rigs to the model, and animate the model by changing parameters representing the rigs.

The memory 106 may include, for example, any conventional hardware implemented memory device and may store, for example, a modeling package 110, a parameter importer 112, a graph dependency solver 114, a graph compiler 116, a code optimizer 118, a code generator 120, a code interpreter 122 and a code loader 124.

The modeling package 110 may include any software modeling and animation package, for example, the Autodesk® Maya® package. In the present example, the modeling package 110, designed to create animation content, includes a component configured for a user to create a character model and a component configured to create a corresponding directed graph which contains nodes representing operations that act on the character model and connections each of which represents data flow from a source end to a destination end. The character model contains information relating to geometric shapes of the character model and properties of the scene including the lighting conditions, the material and the texture map on the model surface, which may be used for rendering the 3D character model into a realistic character. The modeling package may also associate rigs with a skeleton model containing joints, through which the user may animate character models, and create directed graphs of operations that act on various parts of character models. The modeling package further may have the capability of rendering realistic graphical animation on the user terminal 104 to create smooth animations.

In an embodiment, the system includes a parameter importer 112 component that is a pipeline tool that explores the data produced by the modeling package 110 and extracts all the information needed by subsequent rendering process. The parameter importer 112 may produce a database containing a representation of the directed graph of operations applied to the character model. The importer 112 may also extract all of the graphical properties of the scene, including model geometry, shading information, and skeletal hierarchy of the character model and store these properties in the database.

For example, the graph dependency solver 114 includes tools for processing the directed graph generated from the modeling package 110. The graph dependency solver 114 takes inputs of directed graph from the parameter importer 112 to determine the order of the operations to be applied to the character model. The graph dependency solver 114 also may modify the directed graph to ensure that certain constraints are not be violated. For efficiency, the dependency solver 114 may remove portions of the directed graph that are not needed for subsequent rendering processes. The dependency solver 114 may abort the process and report to the user as unsolvable if the directed graph contains cycles.

In a further embodiment, the graph compiler 116 component includes tools to translate each node in the directed graph into a sequence of virtual machine language instructions, for example, Java® programming language with Java® virtual machine or Microsoft .NET Framework, which perform the operations represented in the nodes. The virtual machine may be a hardware-based system virtual machine running an operating system, for example, Linux, Microsoft window, or a software-based process virtual machine. The instructions for each node may be output to a single stream in the order determined by the dependency solver 114. In embodiments of the present invention, the graph compiler 116 does not provide completely arbitrary machine code. Instead, for example, the graph compiler produces code for a virtual machine whose instructions are tailored to the types of operations performed by, for example, typical character rigs. The code generator may then translate the result into C++ code, or other applicable code, to allow compilation to machine code by a compiler, for example, a commercial compiler.

The code optimizer 118 component may include tools that perform high-level optimization to the instructions based on information available when evaluating each node. The tool may read the instruction stream output from the graph compiler 116 and apply a variety of algorithms to reduce redundant operations, code size and complexity. Examples of optimization algorithms may include register move, dead code removal, identity operations, constraint folding, duplicate results, and peephole optimizations.

For example, the code generator 120 includes tools to produce a register allocation table, external variable bindings, and any additional information required to execute the code within the virtual machine. Additionally, the tool optionally may convert the resulting virtual machine instructions into programming language codes, for example C or C++, which can be compiled by a programming language compiler to further improve speed of execution.

The interpreter 122 may include utility used by the runtime environment to read the virtual machine language and perform the operations described therein to the three-dimensional character prior to rendering.

The code loader 124 may include utilities that load the final compiled token stream and character model information onto a modeling package, for example, the Autodesk® Maya® package, in which the animation by deforming a character model may be rendered in real-time.

Figure 3:
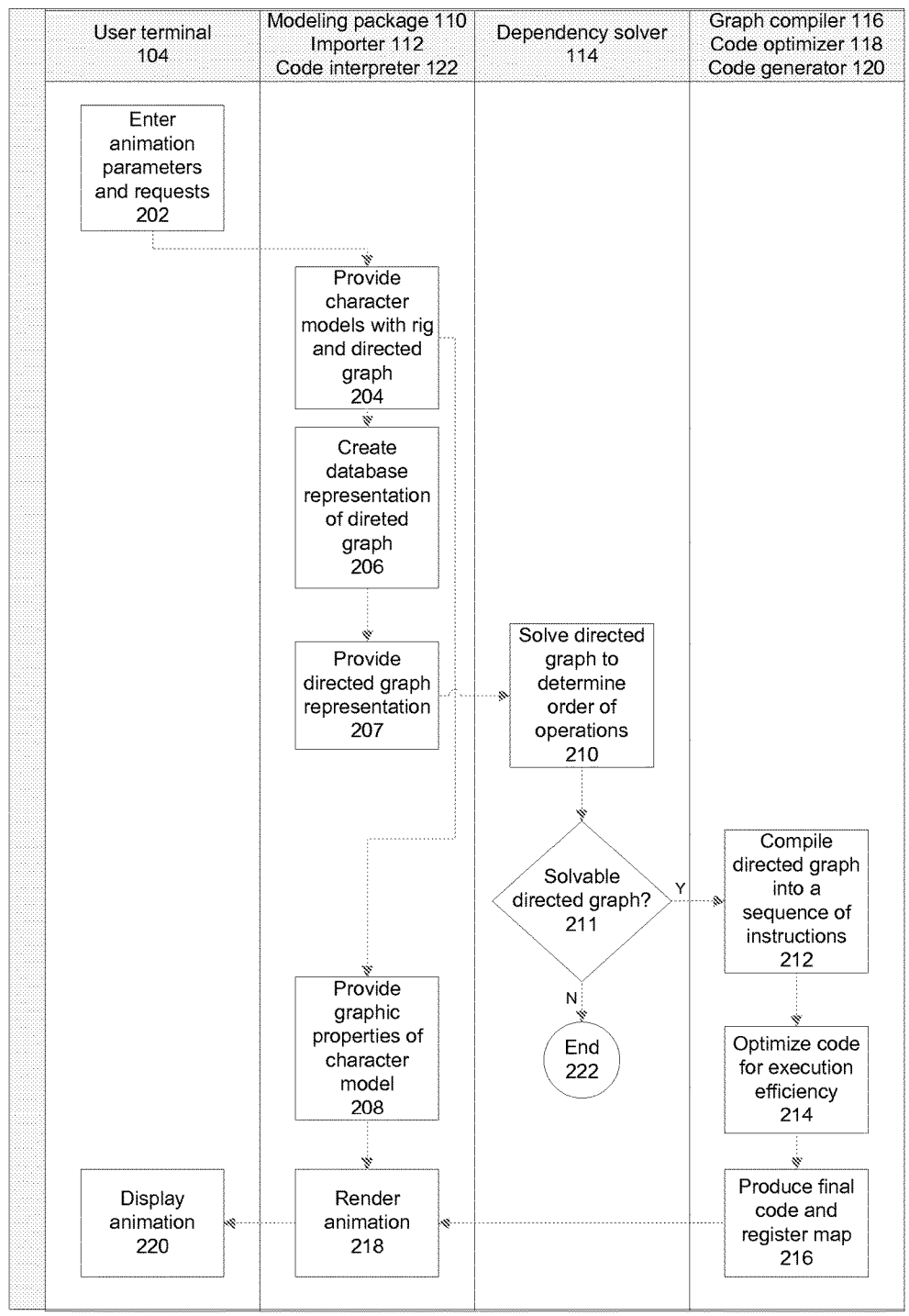
FIG. 3 shows a flowchart illustrating a method of animating a graphic character according to an example embodiment of the present invention.

FIG. 3 shows a flowchart illustrating an embodiment for real-time pose-based deformation of character models according to the present invention. At 202, a user inputs through an input device, parameters that may be needed for animating character models. The input device may include a keyboard, a computer mouse, a pointing device, a joystick, a wired or wireless handheld controller, or any sensor that is capable of converting physiological signals into animation parameters. At 202, the user inputs commands for starting an animation and parameters associated with the characterization of the animation, for example, rigs associated with a character which may be used for animating the character.

Figure 4:
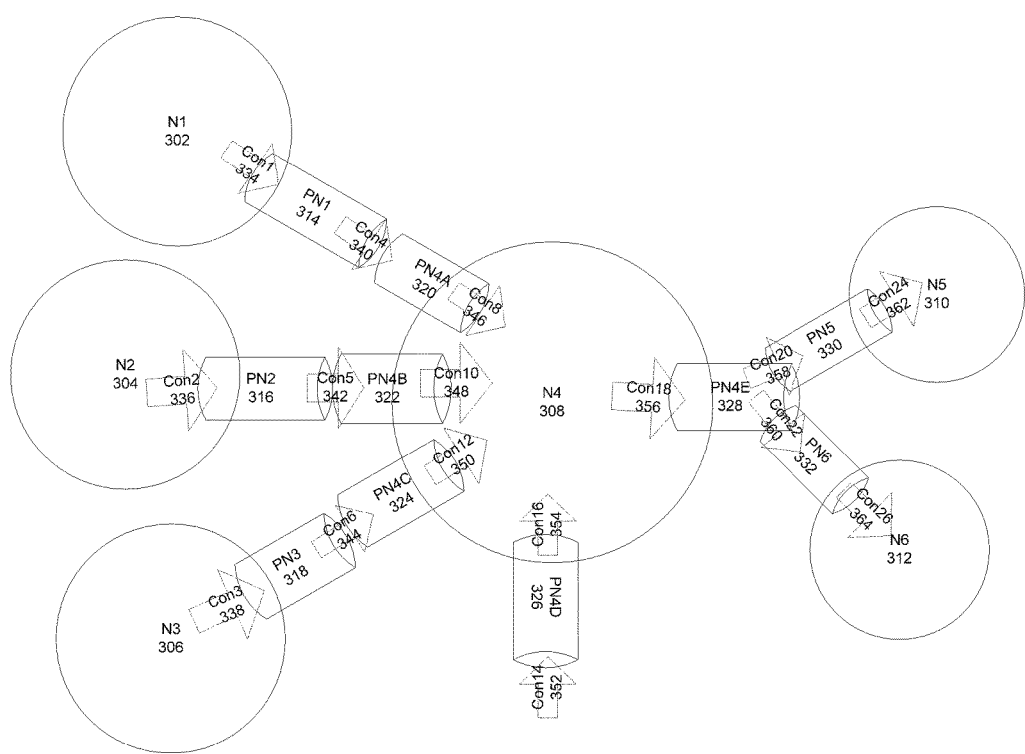
FIG. 4 shows a diagram illustrating a portion of a directed graph according to an example embodiment of the present invention.

At 204, a user of the method uses the modeling package, for example, the Autodesk® Maya® package, to import from a data source or create a 3D character model representing the shape and characteristics of the character based on input parameters received from the user. The character model is typically the object that the user intends to animate. The user may associate rigs with a skeletal model through which the user may further secondarily animate the character model. The user may also create a directed graph containing nodes and connections. FIG. 4 shows a diagram illustrating a portion of a directed graph according to an example embodiment of the present invention. The nodes, for example, N1 302, N2 304, N3 306, N4 308, N5 310 and N6 312, may represent high-level operations to be performed, for example, constraining a set of joints to follow other joints or distributing twist given an input matrix. Nodes may contain plugs, for example, Node N1 302 containing plug PN1 314, Node N2 304 containing plug PN2 316, Node N3 306 containing plug PN3 318, Node N4 308 containing plugs PN4A 320, PN4B 322, PN4C 324, PN4D 326, PN4E 328, Node N5 310 containing plug PN5 330 and Node N6 312 containing plug PN6 332. In an example, these plugs represent properties associated with these nodes wherein the plugs may be classified into one of three types of plugs, i.e., input, output or attribute plugs. An input plug may include a value that is required for computing the output result of the node. An output plug may include the result produced by a node computation at the time the node is evaluated. An attribute plug may include a value that has been applied to the node, but may not necessarily affect the output of the node. For example, the node N4 308 includes input plugs PN4A 320, PN4B 322 and PN4C 324, an output plug PN4E 328, and an attribute plug PN4D 326. Input and attribute plugs may be assigned with constant values or be fed by connections from plugs connected to another node.

The connections, for example, Con1 to Con26, 334 to 360, may represent data flow from a first object, for example a node or a plug to a second object, for example, another node or another plug. A graph is directed if connections in the graph have a source end and a destination end. Any type of plugs and nodes may constitute the source end of a connection, but only input or attribute plugs and nodes may constitute the destination end of a connection. Therefore, a connection may represent data flow from a node to a plug, or from a plug to a node, or from a plug to another plug, or from a plurality of nodes/plugs to a plurality of nodes/plugs. In an embodiment of the present invention, approximately 30 different nodes are supported, and each node may be capable of performing several different operations. For example, the "Plus/Minus/Average" node may add, subtract, or average an arbitrary number of inputs.

In an example runtime engine according to an embodiment of the present invention, a scene may be represented by a number of related graphic properties of the character model including model, materials, morphs and mathnode data. The model may include a set of vertices and polygons which represent the shape and material assignments to the character. It may also include a representation of the skeletal model and information describing how vertices are influenced by joints in the skeletal model. The materials may include a set of surface properties and image maps which represent the surface shading and color of the character model. The morphs may include a set of vertices and normal vector offsets which may be applied to vertices on the character to deform the shape of the character model. In an example, the morphs are used to sculpt local or global variations in shape which are hard to accomplish with bone-based deformation, for example, joint creases or muscle flex. Mathnode data refers to, for example, an instruction stream and support data produced by the graph compiler or optimizer. Mathnode data is how one collectively may refer to the output of example embodiments of the present invention. The mathnode data may comprise a compiled token code for the deformation rigs, along with information used to bind both inputs and outputs to the scene properties. Animation data, if present in the scene, may be automatically bound to system inputs at user terminal 104. The method may also provide information specifying which system inputs and what data types are present. The information may be used at runtime to validate the character rigs.

At 206 of FIG. 3, a parameter importer application 112 converts the character model formatted in the modeling package 110 into a graph representation stored in a database. The scene content is traversed so that each node in the directed graph generated in the modeling package may be compared to a list of nodes whose operations are supported. On encountering such a node, a node representation is created in the database, and the necessary fields from the original node may be copied into it. Additional data may also be generated according to the type of the node. In an example embodiment, the importer 112 may generate information of connections as pairs of parents and children, an useful information which may not be readily available in a modeling package, for example, Autodesk® Maya®. The importer 112 may also calculate other information, for example, matrix inverse on joint nodes and similarly apply to the node representation in the database when applicable.

At 208 of FIG. 3, for example, the importer 112 extracts graphic properties of the character model including geometry in the scene, materials and surface property of the model and animation parameters, and provide these parameters to an animation rendering engine 218.

At 210 of FIG. 3, for example, a graph dependency solver 114 determines the order of operations represented at nodes of the directed graph for the character model. In an example embodiment of the present invention, both nodes and plugs are represented with a single data type call connectable. Plugs are connected to nodes and/or other plugs. The direction of connections between a node and its plugs is be determined based on whether the plug is an input or output plug. This generalization may result an efficient implementation of the graph solver.

In an example embodiment of the present invention, the order of node operation may be resolved in following steps:
    Identifying all sources in the graph. A source is a connectable item which is a source to a connection, not a destination. Each connectable may be assigned an initial dependency count based on the number of input connections connected to it. The dependency count represents the number of dependencies that need to be resolved before the connectable item may be evaluated.
    Adding to an initial list all connectable items whose dependency count is zero and thus may be ready for immediate evaluation.
    Removing connectable items from the list and reducing the dependency count of those items connected to the removed items by one. Items whose dependency count reaches zero may be added to the list thereafter. In an example, when the dependency count of a node type connectable reaches zero, the node is assigned an index number in an increasing manner which represents the final location of that node in the overall solve order.
    Once the list of zero-dependency items is empty and all connectable items in the scene have been visited, the dependency graph may be deemed solved 211. If the list of zero-dependency items is empty, but there are still connectable items in the scene which have not been visited, the dependency graph is deemed to contain cycles and therefore cannot be solved. An error message may be generated, and the process is ended 222.
    Reordering the nodes of the dependency graph in the database in the order to be solved.

At 212 of FIG. 3, for example, a graph compiler 116 visits each node in the graph in the solve order produced by the dependency solver 144. For each node in the graph, a sequence of instructions is generated which perform the task represented by the node and its inputs. For example, these instructions have a one-to-one mapping to the final instruction tokens used by the runtime code interpreter. According to an example embodiment of the present invention, instructions may include generic matrix, vector, or scalar type of operations, while other operations may include specialized instructions designed to handle complex operations with minimal overhead. In an embodiment, registers are created as codes for each node generated.

In an example, nodes include attributes which determine modes of operation so that certain input/output values may only be used for certain type of operations. In an example embodiment of the present invention, registers are assigned names by concatenating the name of the node and plug they represent while being tagged with information about the plug they represent, the type of value stored by the register (matrix, vector, or scalar), and information whether that plug is transient or a system input or output.

The output at 212 of the graph compiler 116, for example, includes an instruction stream which replicates the operations performed on the character model using a set of registers for the computation.

At 214 of FIG. 3, for example, the code optimizer 118 takes the instruction stream produced by the graph compiler 116 to perform a series of contractive operations to the instruction stream. These contractive operations are all designed to reduce either the instruction counts or the complexity of the operations performed.

At 216 of FIG. 3, for example, the code generator 120 takes the output from the code optimizer 118 and produces a hardware ready instruction stream and any additional information required to execute the code. Additional information may include register storage requirements, constant register data, and data to bind system registers to the appropriate data sources and targets. In an example, the code generator 120 performs register allocation by iterating through the code and dynamically assigning locations within a block of managed storage. Register storage may be allocated on first use and reclaimed on last use. Constants may be allocated statically from a single pool of memory. The generated instruction stream may reference the registers it uses by location within the final output storage block, making interpretation of the code much simpler.

In an example embodiment of the present invention, the final register block is laid out as follows:

| constants | registers |

The generated code may reference constants and registers by index in a way such that constants have negative indices and registers have positive indices. In this way, the interpreter needs no special cases to handle the difference between constants and registers since everything may be accessed relative to a pointer to the first register storage location. Register format may be implied by the instruction token—different instructions exist for operating on scalars, vectors, and matrices, so that the interpreter may not need to make decisions based on the register types. In an example embodiment of the present invention, 78 instructions are supported in a preferred embodiment. As an example, the instruction format is as follows:

| Token | Size | register| register . . . |

In an example embodiment of the present invention, the token and size may be 8-bit values, and the register indices are 16 bit. Since each instruction may use a different number of register operands, the Size value may store the number of bytes of storage used by this instruction so as to allow the interpreter to advance through the instruction stream without additional lookup tables.

In an example embodiment of the present invention, the code generator 116 may optionally produce C/C++ source code which performs the same operations as the token code, but in a form which may be compiled into machine code by a C/C++ compiler. The resulting code is as much as 70% faster than the interpreted code using similar computation resources. In an xample embodiment of the present invention, the code generator 116 produces a header file containing the function definition along with input and output structures taken by the function. The generated function makes use of in-house library functions for vector, matrix, and quaternion math, as well as a number of worker functions which are implemented efficiently on each target platform. The generated code may be cross-platform by design.

At 218 of FIG. 3, for example, a character model is animated using pose-based deformation. In an example embodiment of the present invention, a runtime code interpreter 122, for example, a virtual machine, executes the token code generated by the code generator 116. This interpreter iterates through the instruction stream one token at a time. Each token has a corresponding function, executed through a lookup table, which performs the operation indicated by that token.

Figure 5:
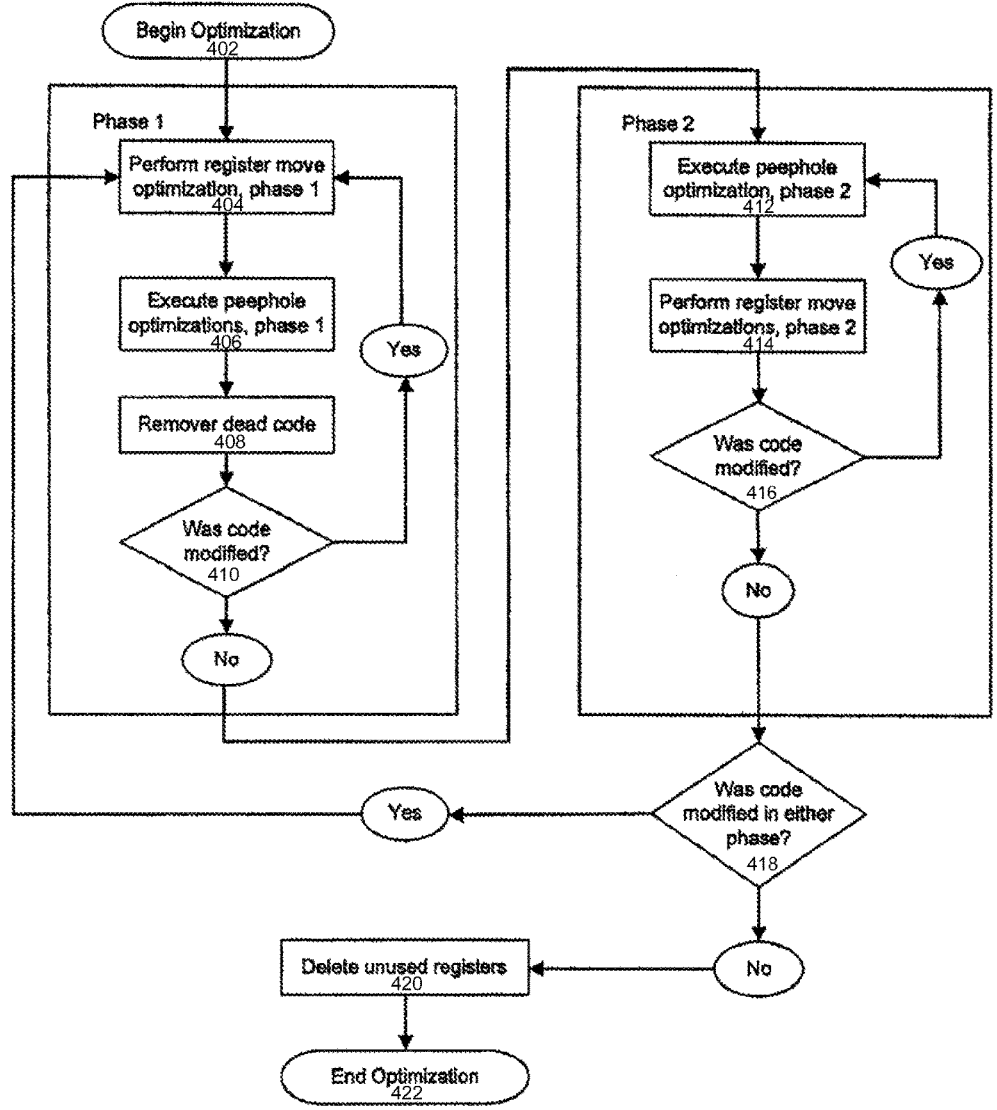
FIG. 5 shows a flowchart illustrating a method of optimizing code according to an example embodiment of the present invention.

FIG. 5 shows a flowchart of a code optimizer according to an example embodiment of the present invention. During the optimization operation, register usage counts are maintained so that anytime the usage count of a register becomes zero, the register is deemed no longer in use and may be deleted.

For example, the code optimizer 118 performs one or more types of optimizations including, for example:

Register Move: The following is an example of the kind of code produced by the graph compiler 116:

MultNode.Input=SceneInput.EyeBlink;
MultNode.Output=MultNode.Input*MultNode.Multiplier;
EyeJoint.RotX=MultNode.Output;
EyeJoint.RotateMatrix=CreateRotateXMatrix(EyeJoint.RotX).

In this example, half of the operations in the code are simply moving values from one place to another. A register move optimization may replace operations of the form:

$B=A;$ $C=B$ op $D;$ with $C=A$ op $D;$

This code below may accomplish the same result as the above sample codes, but in a much more efficient manner:

MultNode.Output=SceneInput.EyeBlink*MultNode.Multiplier;
EyeJoint.RotateMatrix=CreateRotateXMatrix (MultNode.Output);

Additional constraints, however, may be considered in register move operation. For example, a register move operation may take:

$B=A;$ $D=B+C;$ and convert it to this:

$B=A;$ $D=A+C;$

Then because register B is not used, it may be removed with a result of $D=A+C.$ The additional constraint is that in order to remove register B, it must not be used after a modification to the register B, as in the following example:

$B=A;$ $D=B+C;$ $A=G;$ $F=B+E.$

In this case, line 2 may be changed to $D=A+C;$ but line 4 may not be changed to $F=A+E;$ because register A is modified at line 3.

Dead Code Removal: Registers may be tagged as being inputs (external inputs to the system), outputs (results from the system to the character scene properties), or transient (values used internally by the system during computation). If an instruction in the stream is the last to write a register which is transient, i.e., not an output, then the result of that instruction is unused, and the instruction may be deleted.

Identity Operations: In certain situations, an operation may produce results identical to their inputs, for example, multiplying or dividing by 1.0, adding or subtracting by 0.0, and matrix multiplication by the identity matrix. These operations may be converted into register moves, which may in turn be optimized by the register move optimization.

Constant Folding: Constants may be named uniquely in the same manner as other variables to the extent that the same numeric value may be used multiple times under different names. In a constant folding optimization, once a final register set is determined, all constant registers are compared against each other to find the minimal subset of unique numeric values. Each uniquely named constant register that uses a numeric value seen previously with another name may be tagged as an alias and assigned a pointer to the value it duplicates. During register allocation, all aliases may be assigned to the same instance of the constant in the generated register table.

Duplicate Results: Many operations may make use of the same source value, and often that value may undergo transformations before being used. For example, an angle may be converted from radians to degrees prior to a comparison. If the same source value is used in several comparisons, the conversion process may be repeated. Since the results will be the same, the system may modify the code to use the previously computed value and the code to compute it again is removed.

Peephole optimizations: Much of the generated output may contain certain patterns which may be detected and replaced with more efficient code. The peephole optimizer iterates the code looking for and replacing these patterns. As an example, consider these lines of code:

Vector vTemp=GetMatrixTranslation(m);
MultiplyVectorByMatrix(vTemp, Rot);
SetMatrixTranslation(m, vTemp);

These lines of code may be replaced with this single line of code which produces the same results in fewer operations with less temporary storage:

MultiplyMatrixTranslationByMatrix(m, Rot).

In an example embodiment of a code optimizer, the code is optimized through an iterative process to remove redundancies in the code. At 402, the optimizer begins a optimization process. In the phase 1, the optimizer performs register move optimization 404, execute peephole optimization 406, and remove dead code 408. At 410, the optimizer checks whether the code has been modified during the phase 1 optimization process. If the code is modified, the optimizer returns back to 404 and continue the optimization process until there is no more modification to the code during phase 1 optimization.

Then the optimizer may move to phase 2 optimization during which the optimizer may execute peephole optimization 412 and perform register move optimizations 414, followed with a check whether the code has been modified at 416. If there is modification to the code during phase 2 optimization, the optimizer may return to 412 and continue the phase 2 optimization process until there is no modification at 416.

At 418, the optimizer may further check whether there is modification to code during either phase 1 or phase 2 optimization process. If there is modification, the optimizer may return to 404 and repeat the phase 1 and phase 2 optimization process. The iterative optimization process may continue until there is no modification to the code during phase 1 and 2 optimization process. Then, the optimizer may delete unused registers 420 and proceed to end the code optimization process 422.

In an example embodiment of the present invention, a code loader tool 124 includes a runtime interpreter engine and in the instance of the Maya plug-in application, it may include a runtime interpreter along with a Maya specific code for handling the various tasks required to render the character. A companion tool may parse the scene contents to extract the vertex, polygon, skeleton, input, output, and token information. This information is stored in a file which is more easily validated by an end-user tool than the original format. The loader 124 may use the register binding information to present input attributes on the node which the user can connect to an animation skeleton to drive the character model deformation.

Figure 6:
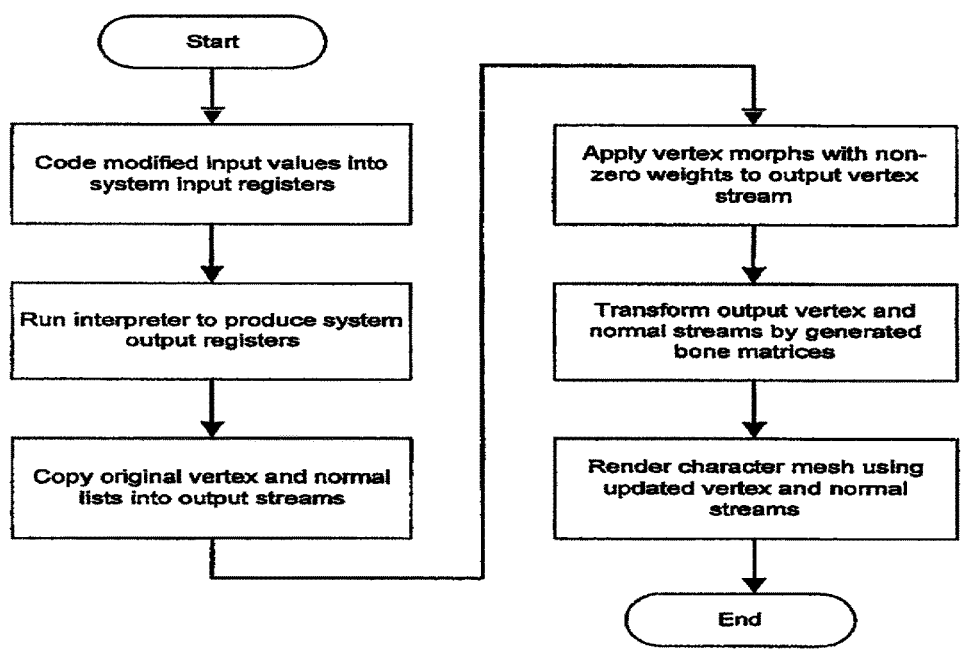
FIG. 6 shows a flowchart illustrating a method of animating a character model in real time according to an example embodiment of the present invention.

In an example embodiment of the present invention, when any input to the plug-in is modified, steps in FIG. 6 are executed in sequence. This process is complex but executes an order of magnitude faster than the original graph of operations in the available products' internal node format, resulting in a significant workflow improvement for character animators. Using the embodiments of the present invention, a character animator can work on a multiple character scene with immediate feedback, and still see exactly what the in-game deformation results will look like.

In the foregoing specification, the invention has been described with reference to specific embodiments thereof. It will, however, be evident that various modifications and changes may be made thereto without departing from the broader spirit and scope of the invention. For example, each feature of an embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A system for animating a graphic character, comprising:
   a modeling component of a hardware implemented memory device configured to provide a character model associated with controls for animating the character model and to create a directed graph which contains nodes representing operations that responsive to the controls, act on the character model, and connections each of which represents data flow from a source end to a destination end;
   a dependency solver of the hardware implemented memory device component configured to determine the order of operations recursively based on a dependency count for each node of the directed graph, the dependency count representing a number of dependencies that need to be resolved for a selected node; and
   a graph compiler component of the hardware implemented memory device configured to compile the directed graph into a sequence of instructions that perform the operations represented by the nodes.

2. The system of claim 1, further comprising:
   an optimization component configured to generate an optimized version of the sequence of instructions, wherein redundancies in the sequence of instructions are automatically reduced.

3. The system of claim 1, further comprising:
   a code generator component configured to convert the sequence of instructions into machine executable codes.

4. The system of claim 1, further comprising:
   a code loader component configured to load the machine executable codes onto an interpreter residing in a virtual machine; and
   a graphic rendering component configured to render the deformation of character model based the controls and parameters of the character model.

5. The system of claim 1, wherein the nodes contain plugs associated with node properties.

6. The system of claim 1, wherein the plugs are one of three types, wherein the first type is an output plug denoting a computation result for the node, wherein the second type is an input plug required for computing the node result, wherein the third type is an attribute plug representing an attribute value applied to the node.

7. The system of claim 1, wherein the connection represents transmission of a value from a first end to a second end of the connection.

8. The system of claim 7, wherein the first end of the connection is a plug of the first node and the second end of the connection is a plug of the second node.

9. The system of claim 8, wherein the first end of the connection is any type of plugs or nodes, and the second end of the connection is input plugs, attribute plugs, or nodes.

10. A non-transitory computer-readable storage medium encoded with instructions configured to be executed by a processor, the instructions which, when executed by the processor, cause the performance of a method for animating a graphic character, comprising:
- providing a character model associated with controls for animating the character model;
- creating a directed graph which contains nodes representing operations that responsive to the controls, act on the character model, and connections each of which represents data flow from a source end to a destination end;
- providing the directed graph to a dependency solver, wherein the order of operations is determined recursively by the dependency solver based on a dependency count for each node of the directed graph, the dependency count representing a number of dependencies that need to be resolved for a selected node; and
- compiling the directed graph into an electronic data stream including a sequence of instructions that perform the operations represented by the nodes.

* * * * *